United States Patent
Robinson et al.

(10) Patent No.: US 6,628,879 B2
(45) Date of Patent: Sep. 30, 2003

(54) ADAPTER FOR OPTICAL FIBER CLEAVER

(75) Inventors: Scott Thomas Robinson, Redmond, WA (US); Michael Masatsugu Itano, Seattle, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/916,562

(22) Filed: Jul. 26, 2001

(65) Prior Publication Data

US 2003/0021544 A1 Jan. 30, 2003

(51) Int. Cl.$^7$ ................................................. B26D 3/08
(52) U.S. Cl. ........................ 385/134; 385/147; 225/96; 225/96.5
(58) Field of Search .................... 385/77, 78, 134, 385/135, 137, 147; 225/96, 96.5; 83/879; 30/308

(56) References Cited

U.S. PATENT DOCUMENTS

| | | | | |
|---|---|---|---|---|
| 4,257,546 A | * | 3/1981 | Benasutti | 225/96.5 |
| 4,619,387 A | | 10/1986 | Shank et al. | 225/96.5 |
| 4,621,754 A | | 11/1986 | Long et al. | 225/96 |
| 4,852,244 A | | 8/1989 | Lukas | 29/566.3 |
| 4,976,390 A | | 12/1990 | Gee et al. | 225/96 |
| 5,031,321 A | | 7/1991 | Briscoe | 30/134 |
| 5,063,672 A | | 11/1991 | Grois et al. | 30/272.1 |
| 5,088,637 A | | 2/1992 | Teurlings | 225/1 |
| 5,123,581 A | | 6/1992 | Curtis et al. | 225/2 |
| 5,125,549 A | | 6/1992 | Blackman et al. | 225/96.5 |
| 5,301,868 A | | 4/1994 | Edwards et al. | 225/96.5 |
| 5,351,333 A | | 9/1994 | Chambers | 385/134 |
| 5,360,464 A | | 11/1994 | Yamauchi et al. | 65/410 |
| 5,395,025 A | | 3/1995 | Borer et al. | 225/2 |
| 5,501,385 A | | 3/1996 | Halpin | 225/96 |
| 5,563,974 A | | 10/1996 | Carpenter et al. | 385/85 |
| 5,838,850 A | | 11/1998 | Mansfield et al. | 385/134 |
| 5,946,986 A | | 9/1999 | Dodge et al. | 81/9.51 |
| 5,949,938 A | | 9/1999 | Tabur et al. | 385/64 |
| 6,023,996 A | | 2/2000 | Dodge et al. | 81/9.51 |

FOREIGN PATENT DOCUMENTS

| GB | 2308361 | 6/1997 | G02B/6/25 |
|---|---|---|---|
| WO | WO 91 03750 | 3/1991 | G02B/6/25 |
| WO | WO 98 47030 | 10/1998 | G02B/6/25 |

OTHER PUBLICATIONS

Patent application 09/414,581, Oct. 8, 1999 Tabeling.

* cited by examiner

*Primary Examiner*—Brian Healy
*Assistant Examiner*—Kevin S Wood
(74) *Attorney, Agent, or Firm*—Davis Wright Tremaine LLP; George C. Rondeau, Jr.

(57) ABSTRACT

An adapter for an optical fiber cleaver for cleaving optical fiber. The optical fiber cleaver includes an opening therein for receiving a connector ferrule of a first category fiber connector containing an unsheathed optical fiber end portion extending therebeyond. The optical fiber cleaver is designed to cleave a portion of the unsheathed optical fiber end portion extending beyond the connector ferrule. The adapter has a tail piece which can hold an unsheathed optical fiber end portion to be cleaved to a selected length prior to insertion into a second category fiber connector. The tail piece has a diameter similar to the ferrule for insertion into the cleaver opening and a length selected to produce a cleaved unsheathed optical fiber end portion of a length needed for the second category fiber connector different than the length cut by the cleaver for the first category fiber connector.

34 Claims, 6 Drawing Sheets

ADAPTER FOR OPTICAL FIBER CLEAVER

TECHNICAL FIELD

The present invention relates generally to methods and systems for cleaving optical fibers, and more particularly, for cleaving optical fibers for use with form factor connectors.

BACKGROUND OF THE INVENTION

Optical fibers are frequently used in communications systems, generally, where light energy is transmitted very long distances with little or no energy losses. Devices coupled to optical fibers and coupling of optical fibers together require cutting and subsequent connecting of the optical fibers. Unacceptable loss of light energy at a coupling is detrimental to most transmissions and is consequently undesirable.

A junction between light fibers has generally a glass-to-glass interface where one fiber precisely abuts another fiber to minimize energy losses and signal distortions introduced at these junctions. Miles of optical fibers are installed in locations of varying conditions that demand tools to cleave optical fiber, which consistently provide acceptable cleaved fiber and ease of operation.

Conventional optical fiber assemblies include an optical fiber covered by a sheath. An end portion of the optical fiber of a first optical fiber assembly is typically joined to an end portion of the optical fiber of a second optical fiber assembly through the use of mating fiber optic connectors. When fiber optic connectors of a first category are used, the sheath of the end portion of the optical fiber assembly is removed to expose the optical fiber of the end portion as an unsheathed optical fiber. The unsheathed optical fiber is then inserted into a first category connector with the unsheathed optical fiber extending through a ferrule thereof. A portion of the sheathed optical fiber of the optical fiber assembly adjacent the unsheathed optical fiber is also inserted into the first category connector to securely fix the optical fiber assembly to the connector.

Conventional fiber cleavers are used to trim to a desired length the unsheathed optical fiber of the optical fiber assembly that extends beyond the ferrule of the first category connector after the optical fiber assembly has been securely fixed in the first category connector. First category connectors include ST, SC and FC connectors. A distinguishing feature of the first category connector is that the unsheathed optical fiber extending beyond the ferrule of the connector is trimmed after the optical fiber assembly is securely fixed in the connector.

Figure 1:
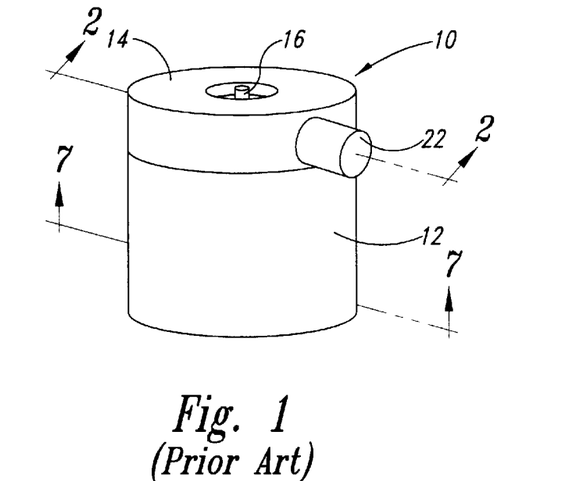
FIG. 1 is a perspective view of an optical fiber cleaver, including a collection receptacle affixed to a housing containing bending and cutting means.
Figure 2:
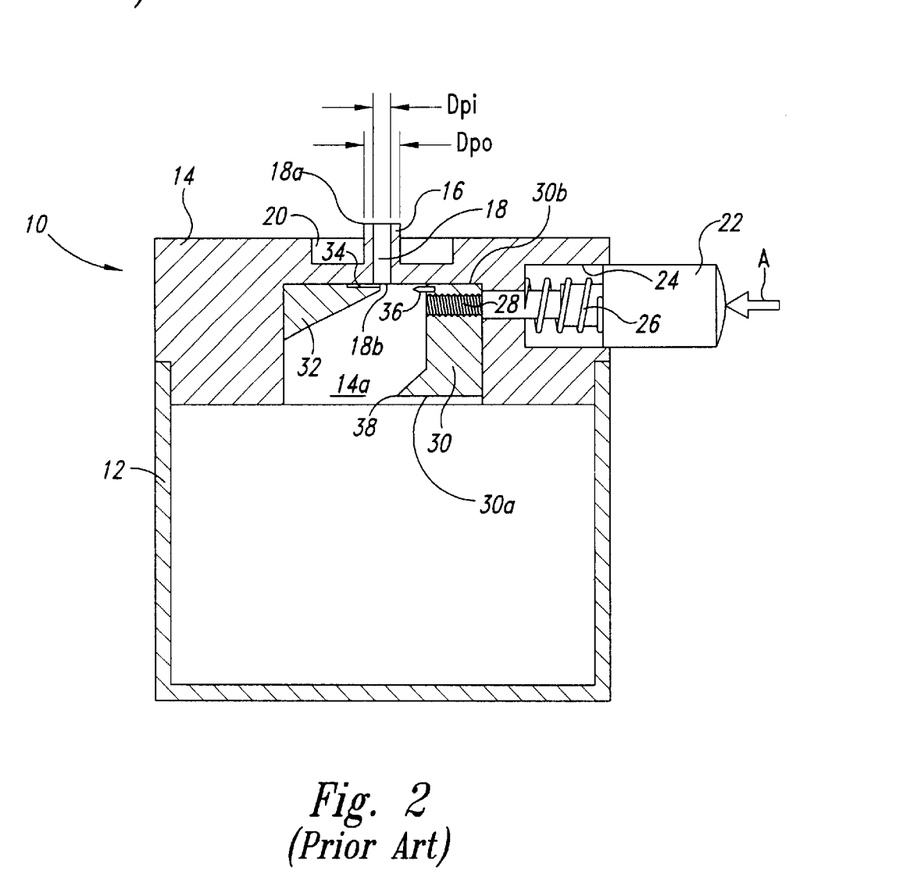
FIG. 2 is a cross-sectional view of the optical fiber cleaver of FIG. 1 taken substantially along line 2—2 of FIG. 1.

One fiber cleaver illustrated in FIGS. 1 and 2 includes a housing assembly having an opening therein for receiving the ferrule of the first category connector and the unsheathed optical fiber to be trimmed. The fiber cleaver also has components within its housing assemblies configured to bend and cleave the unsheathed optical fiber Positioning components are disposed in close proximity to the opening of the housing assembly to control positioning of the ferrule and consequential positioning of the unsheathed optical fiber within the housing assembly leaving a predetermined, exposed miniscule length, $L_m$, of the unsheathed optical fiber extending beyond the ferrule after cleavage of a free end portion of the unsheathed optical fiber.

Due to construction details of conventional fiber cleavers, including use of such positioning components, the conventional fiber cleaver is suitable for only the first category of fiber optic connectors. There exists a second category of fiber optic connectors, such as small form factor connectors, including MTRJ connectors, that requires cutting of the unsheathed optical fiber of an optical fiber assembly to a desired length before the optical fiber assembly is securely fixed into the fiber optic connector. The conventional fiber cleaver designed for the first category fiber optic connector is not designed to cut the unsheathed optical fiber of an optical fiber assembly to proper length for use in the second category fiber optic connector. No readily apparent solution exists other than providing two different fiber cleavers for each technician in the field to handle both categories of fiber optic connectors or replacing the conventional fiber cleavers designed solely for the first category fiber optic connectors with more complicated dual purpose fiber cleavers for both categories of connectors. Either solution necessitates costly manufacture of many additional fiber cleavers.

SUMMARY OF THE INVENTION

The present invention resides in an adapter for use with a fiber cleaver configured to receive a connector ferrule and cleave an unsheathed optical fiber end portion of a first optical fiber assembly extending beyond the connector ferrule. The adapter includes a body having an insertion member configured to be received by the fiber cleaver in lieu of the connector ferrule. The insertion member contains a passageway for removably receiving an unsheathed optical fiber end portion of a second optical fiber assembly and has a passageway opening through which the unsheathed optical fiber end portion of a second optical fiber assembly extends for cleaving by the fiber cleaver while the adapter is received by the fiber cleaver. The passageway is configured to allow insertion into the adapter and removal from the adapter of the unsheathed optical fiber end portion of the second optical fiber assembly while the adapter remains received by the fiber cleaver.

One embodiment of the adapter is useable to convert a fiber cleaver constructed for use with a first category connector to cleave a fiber optic of a fiber optic assembly after inserted within the first category connector, to use with a second category connector to cleave the fiber optic prior to insertion within the second category connector, where the optical fiber assembly has an unsheathed fiber end portion extending beyond an end of a sheathed portion. When used with a first category connector having a connector ferrule with a passageway extending to a passageway opening at a distal end of the connector ferrule, the sheathed portion is inserted within the first category connector with the unsheathed fiber end portion extending through the connector ferrule passageway and out of the connector ferrule passageway opening and extending beyond the connector ferrule distal end.

The fiber cleaver has a housing chamber containing a stop and a housing opening having an end. The housing opening end is adjacent to and opens into the housing chamber proximate to the stop. The housing opening is sized to receive the connector ferrule therein and the stop is arranged to engage the connector ferrule distal end and hold the connector ferrule distal end at a predetermined position within the housing chamber against further movement into the housing chamber with the unsheathed fiber end portion extending beyond the connector ferrule distal end and into the housing chamber. The fiber cleaver has a cleave member within the housing chamber configured to cleave, without use of the adapter, the unsheathed fiber end portion extending out of the connector ferrule passageway opening to a first length extending beyond the connector ferrule distal end.

The adapter has a body with an insertion portion having a distal end. The insertion portion is sized to be removably received within the housing opening with the insertion portion distal end in engagement with the stop. The body has a passageway extending to a passageway opening at the insertion portion distal end. The body passageway sized to receive the fiber optic assembly therein. The body further includes means to hold the fiber optic assembly at a predetermined position within the body passageway with the unsheathed fiber end portion extending out of the passageway opening beyond the insertion portion distal end by at least the amount of the first length and into the housing chamber for cleaving by the fiber cleaver cleave member to a second length. The second length being measured while in the body passageway after cleaving as the sum of the length of the unsheathed fiber end portion extending beyond the end of the sheathed portion to the insertion portion distal end plus the amount of the first length.

In one embodiment the body passageway has a first lengthwise portion sized to receive the sheathed portion of the fiber optic assembly therein and a second lengthwise portion extending to the body passageway opening and sized to receive therein the unsheathed fiber end portion. The body further includes a stop, formed by the difference in width sizes of the body passageway first and second portions. The stop is arranged to engage the end of the sheathed portion when inserted into the body passageway first portion and hold the fiber optic assembly at the predetermined position within the body passageway against further movement toward the body passageway opening.

In the one embodiment, the adapter is used with the second category connector having a passageway sized to receive the sheathed portion of the fiber optic assembly therein with a lengthwise portion of a third length. The body passageway first portion is substantially the same length as the third length.

The body passageway first and second portions of the illustrated embodiment are coaxial.

One embodiment also shows the adapter arranged for use with the housing having an outward surface extending at least partially about an outward end of the housing opening. The body includes a head portion to which the insertion portion is rigidly connected and from which the insertion portion extends. The head portion has a width larger than a width of the insertion portion, and the insertion portion has a length to position the head portion proximate to the outward surface of the housing when the insertion portion is within the housing opening with the insertion portion distal end in engagement with the stop. The body passageway extends through the head portion and is lengthwise through the insertion portion, with the body passageway first portion being located within the head portion.

The embodiment shown can be used with the second category connector having a passageway sized to receive the sheathed portion of the fiber optic assembly therein with an interior stop to engage the end of the sheathed portion when inserted into the connector passageway and having a fiber stub with an inward end spaced away from the interior stop by a predetermined distance. When the unsheathed fiber end portion is cleaved by the cleave member of the fiber cleaver, a cleaved fiber end is produced. The second length is selected to extend the predetermined distance so as to position the cleaved fiber end adjacent to the inward end of the fiber stub when the sheathed portion of the fiber optic assembly is within the connector passageway with the end of the sheathed portion at about the interior stop.

The insertion portion of the adapter is shown with a width to fit snuggly within the housing opening.

The present invention also includes the combination of the above-described adapter with a fiber cleaver.

A method is also disclosed for using the adapter with the foregoing construction in conjunction with a fiber cleaver.

Other features and advantages of the invention will become apparent from the following detailed description, taken in conjunction with the accompanying drawings.

BRIEF DESCRIPTION OF THE DRAWINGS

FIG. 9 is cross-sectional view of the conventional second category fiber optic connector taken substantially along the line 9—9 of FIG. 8.

FIG. 10a is an isometric view of an embodiment of the adapter of the present invention.

FIG. 10b is a cross-sectional view of the adapter taken along the line 10b—10b of FIG. 10a.

DETAILED DESCRIPTION OF THE INVENTION

An adapter is provided to allow fiber cleavers designed for use solely with a first category of fiber optic connectors to be used with a second category of fiber optic connectors as well. The first category of fiber optic connectors requires an optical fiber assembly to be first securely fixed into the fiber optic connector before an unsheathed free end portion of the optical fiber protruding from a ferrule of the fiber optic connector is trimmed so to protrude from the ferrule by only a predetermined miniscule amount. The second category of fiber optic connectors requires an unsheathed optical fiber free end portion of an optical fiber assembly to be trimmed to a desired length before the optical fiber assembly is securely fixed into the fiber optic connector.

A particular fiber cleaver designed for first category fiber optic connectors includes a housing assembly having an opening therein for receiving an unsheathed free end portion of the optical fiber to be cleaved. The fiber cleaver further includes a bender and a cleaving element reciprocally moveable as a unit in a direction transversely and substantially perpendicularly to the longitudinal axis of the unsheathed free end portion of the optical fiber of the optical fiber assembly inserted through the opening of the housing assembly.

A detailed description of a fiber cleaver designed for first category fiber optic connectors is provided by reference to the accompanying drawings wherein FIG. 1 is an overall perspective view of a fiber cleaver 10 comprising a housing assembly 14 having a housing port 16. As an option, the housing assembly 14 is affixed to a receptacle 12 that collects severed ends of cleaved fibers.

Figure 7:
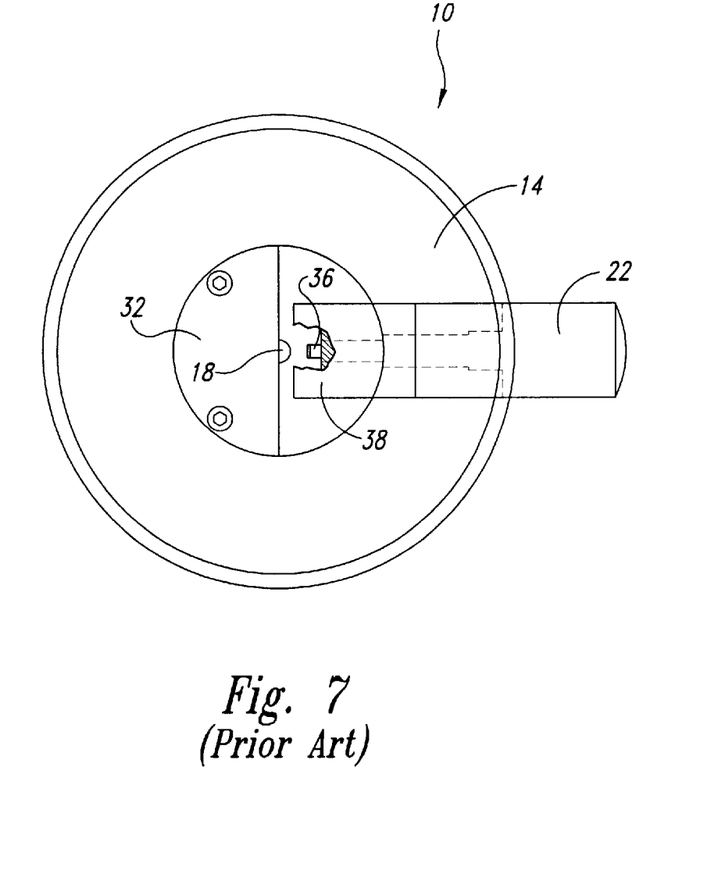
FIG. 7 is a bottom plan cross-sectional view of the optical fiber cleaver of FIG. 4.

The housing assembly 14 is shown in greater detail in FIGS. 2 and 7. In the depicted embodiment, the housing port 16 has a tubular shape with an outer diameter, $D_{po}$, and an inner diameter, $D_{pi}$. The housing port 16 has a port opening 18 with a first end 18a, a second end 18b. An annular recess 20 is machined into the housing assembly 14, which is made of aluminum or other suitable material, and the recess extends about the housing port 16. The housing assembly 14 is shown in FIG. 2 with the receptacle 12, which may also be aluminum and affixed to the housing assembly by friction fit, threaded connection, or other suitable connection. The housing assembly 14 contains a housing chamber 14a in which occurs bending and cleaving of the unsheathed free end portion of the optical fiber protruding from ferrules of fiber optic connectors. Within the housing chamber 14a, positioned at a predetermined depth from the second end 18b of the port opening 18, is a stop 34, cast or machined into a support 32. The stop 34 is formed to extend as shown, partially covering the second end 18b of the port opening 18.

Positioned directly across from the support 32, as depicted in FIGS. 2 and 7, are a bending and cleaving means which act upon the unsheathed free end portion of the optical fiber to be cleaved. The bending and cleaving means includes a boot-shaped pusher 30 having a toe 38 at a first end 30a of the pusher and a blade 36 near a second end 30b of the pusher that is in close proximity to the second end 18b of the port opening 18. In this depicted embodiment of the fiber cleaver 10, the blade 36 preferably comprises diamond. The pusher 30 is connected to a connecting rod 28, threaded as shown into the pusher, which connects the pusher to a plunger 22. A user pushes the plunger 22, in the direction of arrow "A" to apply an inward force through the connecting rod 28 to move the pusher 30 with the blade 36 inward. A spring 26 accompanies the plunger 22 and is positioned within a cylinder 24 to provide a return movement of the pusher 30 within the housing chamber 14a of the housing assembly 14.

Figure 3A:
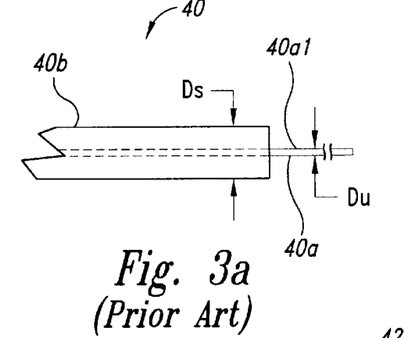
FIG. 3a is a fragmentary, enlarged scale side view of an optical fiber assembly having an optical fiber covered by a sheath with an end portion of the sheath removed to expose an unsheathed optical fiber free end portion.
Figure 3B:
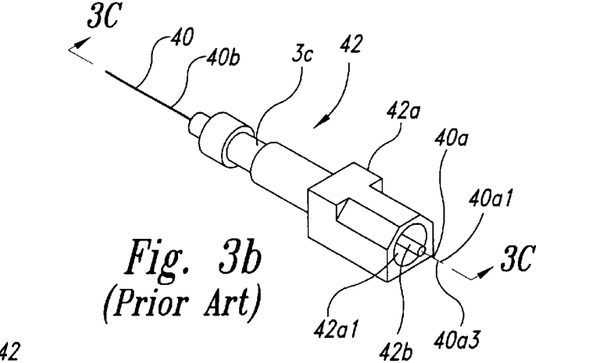
FIG. 3b is a isometric view of a portion of the optical fiber assembly of FIG. 3a securely fixed in a conventional first category fiber optic connector with the sheathed optical fiber end portion contained by a connector ferrule of the prior art first category fiber optic and the unsheathed optical fiber free end extending beyond the connector ferrule prior to trimming.
Figure 3C:
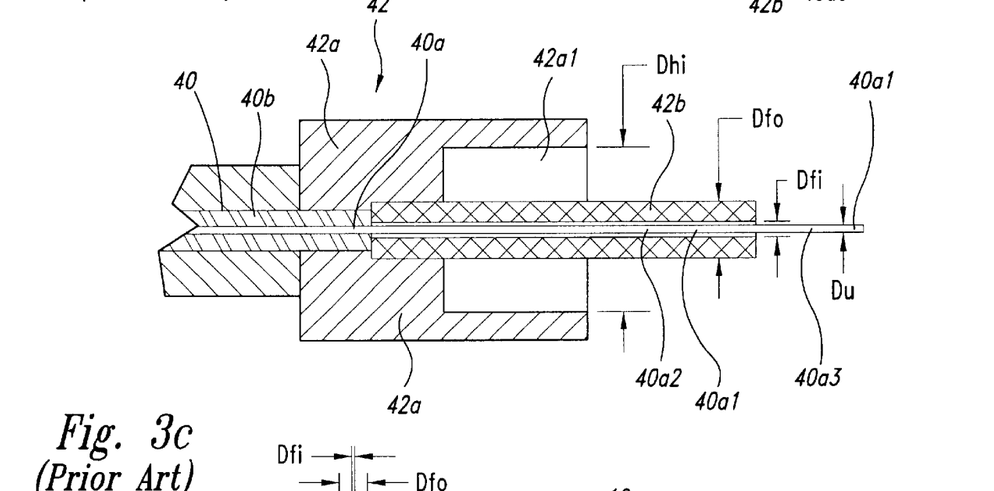
FIG. 3c is an enlarged, fragmentary, cross-sectional view of the conventional first category fiber optic connector of FIG. 3b taken substantially along line 3C—3C of FIG. 3b.

A conventional optical fiber assembly 40 is shown in FIG. 3a and has an optical fiber 40a with a diameter, $D_u$, and a sheath 40b with a diameter $D_s$ covering the optical fiber. In FIG. 3a, a portion of the conventional optical fiber assembly 40 is shown with the sheath 40b removed from an end portion of the optical fiber assembly, thereby exposing the optical fiber 40a and resulting in an unsheathed end portion 40a1 of the optical fiber assembly. In FIGS. 3b and 3c, the optical fiber assembly 40 is shown securely fixed in a conventional first category fiber optic connector 42 having a connector housing 42a and a connector ferrule 42b extending through a connector housing recess 42a1 outward from the end of the connector housing. The connector ferrule 42b has an outer diameter, $D_{fo}$, and an inner diameter, $D_{fi}$, sized slightly larger than the diameter, $D_u$, of the optical fiber 40a.

The connector housing 42a contains a portion of the optical fiber assembly 40 having the optical fiber 40a covered by the sheath 40b. A ferrule portion 40a2 of the unsheathed optical fiber end portion 40a1 of the optical fiber assembly 40 is contained within the connector ferrule 42b, and the remaining portion of the unsheathed end portion extends past the connector ferrule and outside of the first category optic connector as a free end portion 40a3. FIGS. 3b and 3c show the free end portion 40a3 of the unsheathed optical fiber end portion 40a1 extending from the connector ferrule 42b by an amount greater than appropriate for use of the first category fiber optic connector 42 (i.e., prior to trimming or cleaving with the bending and cleaving means). As such, the fiber cleaver 10 is used to cleave off some of the free end portion 40a3 of the unsheathed optical fiber end portion 40a1 of the optical fiber assembly 40.

Figure 4:
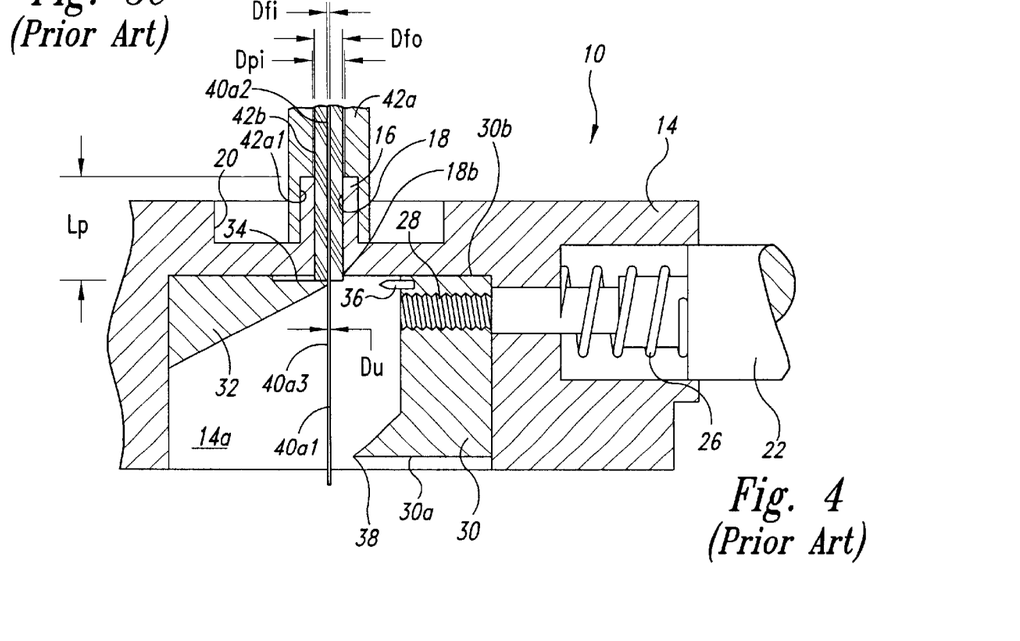
FIG. 4 is a fragmentary, enlarged, cross-sectional view of the optical fiber cleaver of FIG. 2 with the collection receptacle removed, showing the bending and cutting means and showing a portion of the prior art connector ferrule with the unsheathed optical fiber free end portion inserted into an opening in the optical fiber cleaver prior to bending and cutting, the connector ferrule shown containing a portion of the sheathed optical fiber end portion.

FIG. 4 is an enlarged, cross-sectional view of the housing assembly 14, showing the first category optic connector 42 positioned on the fiber cleaver 10, with the housing port 16 seated within the connector housing recess 42a1. When so positioned, the connector ferrule 42b extends through the port opening 18 of the housing port 16 from the first end 18a through the second end 18b of the port opening and has an end of the connector ferrule 42b engaging the stop 34 in the housing chamber 14a. The distance from the first end 18a of the port opening 18 to the stop 34 in the housing chamber 14a is an insertion length, $L_p$. The inner diameter, $D_{pi}$, of the port opening 18 is sized slightly larger than the outer diameter, $D_{fo}$, of the connector ferrule 42b. The outer diameter, $D_{po}$, of the housing port 16 is sized to be received in the connector housing recess 42a1, which has an inner diameter, $D_{hi}$.

Figure 12:
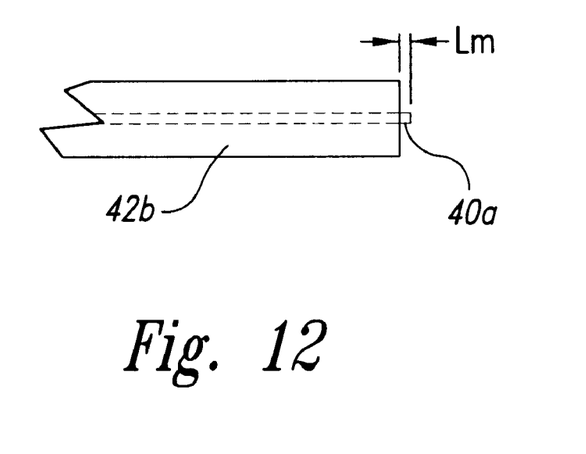
FIG. 12 is a fragmentary, enlarged scale side view of an optical fiber assembly trimmed using the optical fiber cleaver of FIG. 1.

The free end portion 40a3 of the unsheathed optical fiber end portion 40a1 extends beyond the stop 34 and into the housing chamber 14a. As a representative example, if the optical fiber 40a of the optical fiber assembly 40 has a typical diameter, $D_u$, of 125 micrometers and the optical fiber assembly is securely fixed into the first category fiber optic connector 42 as shown in FIG. 3b, after the fiber cleaver 10 has cleaved the free end portion 40a3 of the unsheathed optical fiber end portion 40a1, the free end portion will protrude past the end of the connector ferrule 42b by a predetermined miniscule amount, $L_m$ of 0.004 inches (100 micrometers) as shown in FIG. 12.

Before cleaving by the fiber cleaver 10, the uncleaved free end portion 40a3 of the unsheathed optical fiber end portion 40a1 must be long enough so that the toe 38 of the pusher 30 will bend the free end portion before the blade 36 contacts and scores the free end portion. To be suitable for cleaving by the fiber cleaver 10, a typical uncleaved length of the free end portion 40a3 of the unsheathed optical fiber end portion 40a1 is 40 mm, when the optical fiber assembly 40 is securely fixed in the first category optic connector 42.

The plunger 22 is pushed inward once to cleave the free end portion 40a3 of the unsheathed optical fiber end portion 40a1 of the optical fiber assembly 40. As is conventional practice, the cleaved free end portion 40a3 is then polished at its tip 40a4 (see FIG. 6) with coarse abrasive film followed by polishing with fine abrasive film. The positioning of blade 36 is according to the predetermined miniscule amount, $L_m$, of the free end portion 40a3 of the unsheathed optical fiber end portion that remains uncleaved after the cleaving operation. For the depicted embodiment, the blade 36 is positioned below the stop 34 the same distance as the predetermined miniscule amount, $L_m$, (approximately 0.004 inch (100 micrometers) in the example above) so as to achieve a clean cleave and provide the desired length of the uncleaved free end portion 40a1 of predetermine miniscule amount, $L_m$, (0.004 inch in the example above). The fiber cleaver 10 is suitable for cleaving glass fibers which are fixed in a variety of fiber optic connectors, including ST, SC and FC connectors which are presently those most frequently used.

Figure 5:
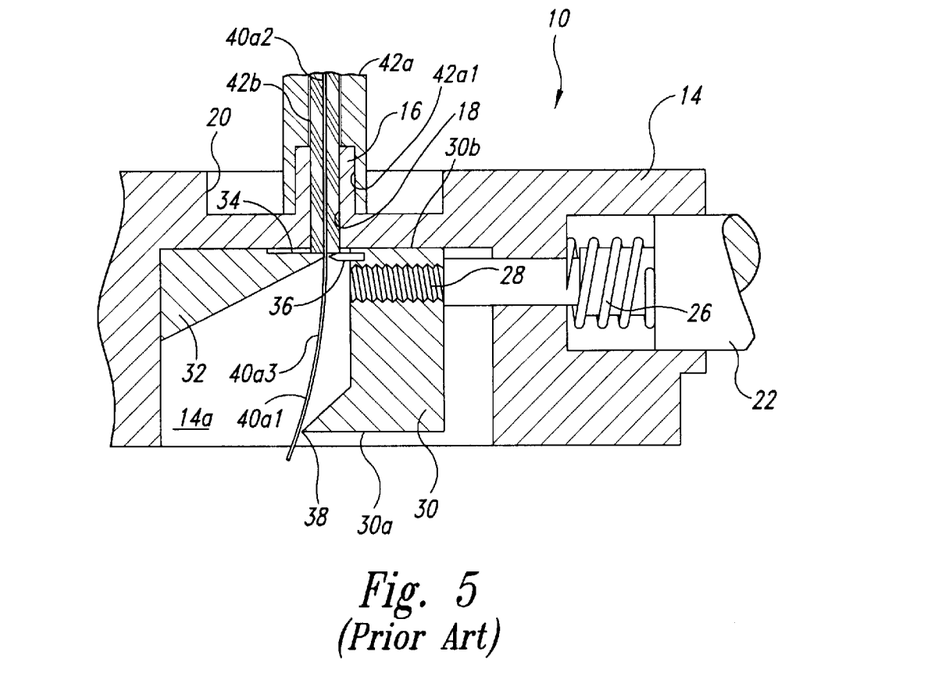
FIG. 5 is a fragmentary, enlarged, cross-sectional view of the optical fiber cleaver as shown in FIG. 4 showing an intermediate step in the bending and cutting of the unsheathed optical fiber free end portion.
Figure 6:
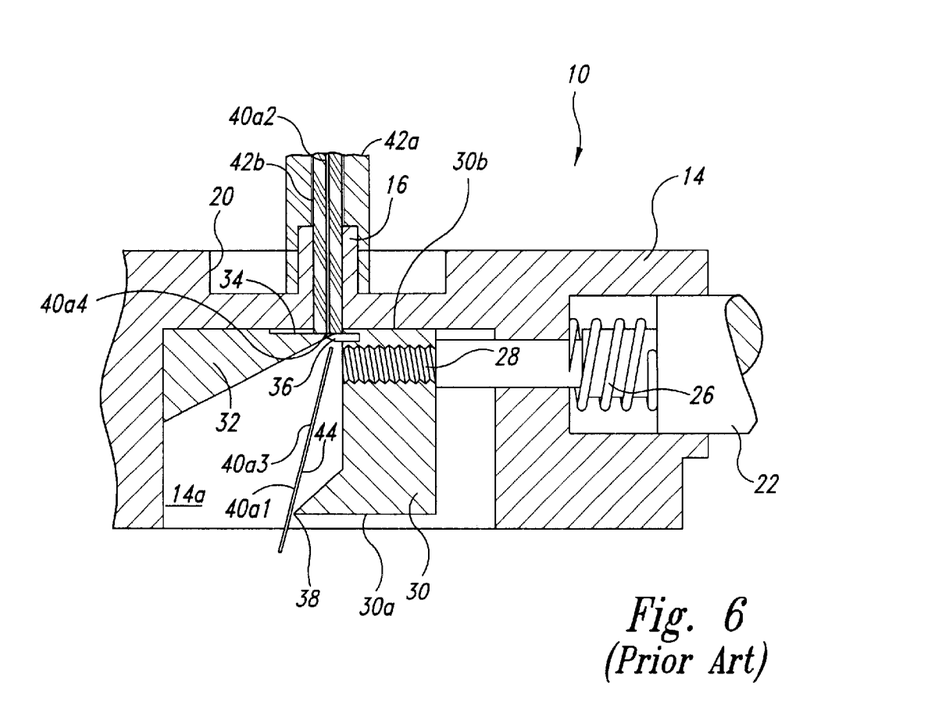
FIG. 6 is a fragmentary, enlarged cross-sectional view of the optical fiber cleaver as shown in FIG. 4 showing completion of the bending and cutting of the unsheathed optical fiber free end portion.

In an intermediate stage of the cleaving operation using the fiber cleaver 10, as shown in FIG. 5, just before cutting by the blade 36, the plunger 22 is depressed sufficiently to bend the free end portion 40a3 of the unsheathed optical fiber end portion 40a1 by the pushing action thereon of the toe 38 of the pusher 30, thereby inducing tension in the free end portion of the unsheathed optical fiber end portion. In the final cleaving stage, as shown in FIG. 6, just after cleaving of the free end portion 40a3 of the unsheathed optical fiber end portion 40a1 by the blade 36, a severed portion 44 of the free end portion 40a3 falls away to be caught in the receptacle 12 (not shown in FIG. 5).

The support 32 having the stop 34 is depicted as a separate component in the assembly shown, bolted into the upper housing assembly 14. However, one skilled in the art will know that this support can be cast or machined as a unitary component together with the upper housing assembly 14.

Figure 8:
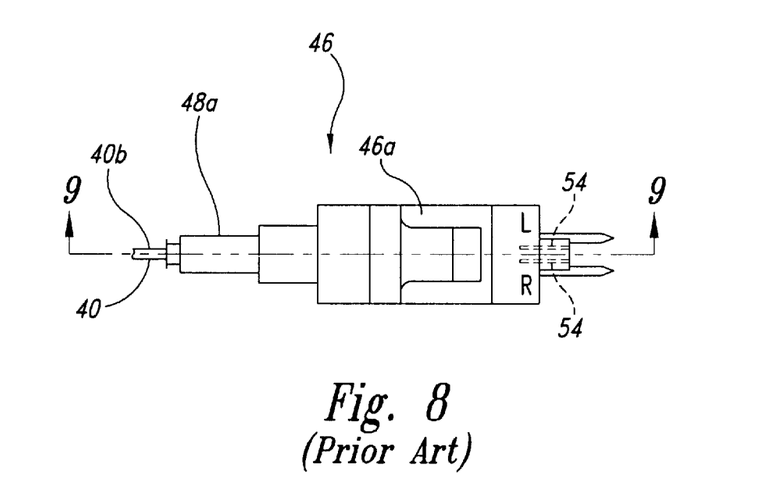
FIG. 8 is side view of a conventional second category fiber optic connector.
Figures 9, 10A, 10B:
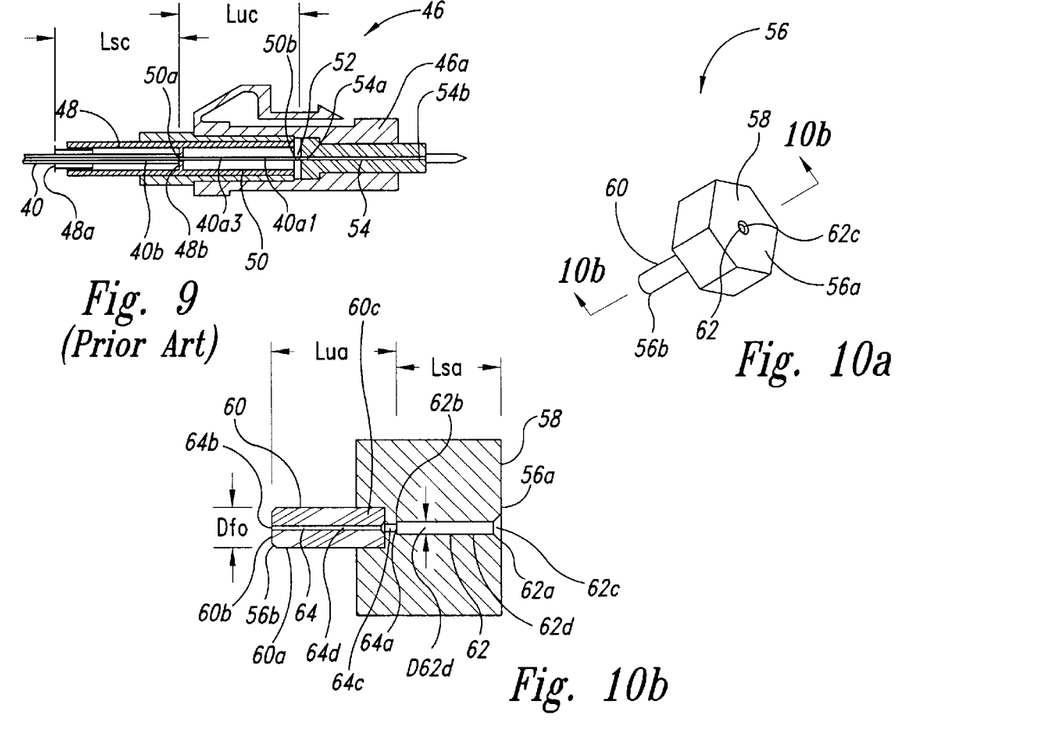

As stated, the present invention provides an adapter 56 to allow use of conventional fiber cleavers, such as the fiber cleaver 10 illustrated, for a conventional second category fiber optic connector 46 even though the fiber cleaver was originally designed for only first category fiber optic connectors 42. The second category fiber optic connector 46 is shown in FIGS. 8 and 9, and has a connector housing 46a and a fiber stub 54 extending within and protruding from the connector housing. The fiber stub 54 has first and second ends 54a and 54b, respectively, both polished at the factory when the basic second category fiber optic connector 46 is manufactured so that the fiber stub does not have to be polished in the field when coupled to the fiber optic assembly 40. The second end 54b of the fiber stub 54 projects forward of a forward end of the connector housing 46a and positioned for end-to-end orientation with a fiber stub of a mating connector (not shown). In the embodiment illustrated in FIGS. 8 and 9, the second category fiber optic connector 46 has two fiber stubs 54 positioned side-by-side to handle two optical fibers, but other embodiments have either one fiber stub or another amount of fiber stubs. The second category fiber optic connector 46 is elongated along a longitudinal axis such that the second category fiber optic connector has a sheathed fiber containment portion 48, and has an unsheathed fiber containment portion 50, both located in the connector housing 46a and in coaxial alignment with each other and the fiber stub 54.

The sheathed fiber containment portion 48 of the second category fiber optic connector 46 has a length, $L_{sc}$, sized to contain therein a length of the sheath 40b of the optical fiber assembly 40. The sheathed fiber containment portion 48 has a first end 48a with an entrance opening for the optical fiber assembly 40 to be inserted into the second category fiber optic connector 46, and has a second end 48b whereat the sheath 40b of the optical fiber assembly is prevented from further insertion into the second category fiber optic connector 46.

The unsheathed fiber containment portion 50 of the second category fiber optic connector 46 has a length, $L_{uc}$, sized to contain the entire length of the unsheathed optical fiber end portion 40a1 of the optical fiber assembly 40. The unsheathed fiber containment portion 50 has a first end 50a, adjacent the second end 48b of the sheathed fiber containment portion 48, and a second end 50b adjacent to the first end 54a of the fiber stub 54 so that when the unsheathed optical fiber end portion 40a1 is positioned in the unsheathed fiber containment portion 50, the end of the unsheathed optical fiber end portion 40a1 will be in end-to-end relation with the inward second end 54a of the fiber stub 54. Any air gap there-between which causes poor light transmission so a small amount of index matching gel 52 is positioned between the end of the unsheathed optical fiber end portion and the inward second end 54b of the fiber stub 54. This avoids the need to polish in the field the end of the cleaved unsheathed optical fiber end portion. Since the first and second ends 54a and 54b of the fiber stub 54 are polished at the factory, before assembly of the second category fiber optic connector 46 in the field, a technician does not have to polish the fiber stub in the field.

Figure 13:
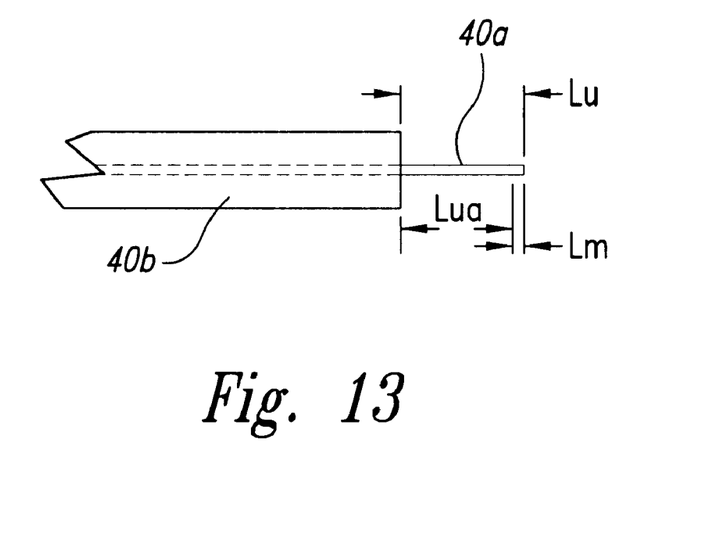
FIG. 13 is a fragmentary, enlarged scale side view of an optical fiber assembly trimmed using the adapter of FIG. 10a installed on the optical fiber cleaver of FIG. 1, as shown in FIG. 11.

As noted above, with the first category fiber optic connector 42, the unsheathed optical fiber 40a1 extending beyond the connector ferrule 42b is cleaved after the optical fiber assembly 40 is securely fixed in the connector, as shown in FIG. 12. However, with the second category fiber optic connector 46, the unsheathed optical fiber end portion 40a1 of the optical fiber assembly 40 must be cleaved to a pre-determined length, $L_u$, before insertion of the unsheathed optical fiber end portion into the second category fiber optic connector 46, as shown in FIG. 13. The predetermined length, $L_u$, is selected as slightly more than the distance between the first end 50a of the unsheathed fiber containment portion 50 and the second end 54b of the fiber stub 54. Any gap that results between the end of the cleaved unsheathed optical fiber end portion and the second end 54b of the fiber stub 54 will be filled with the index matching gel 52. In other words, the predetermined length, $L_u$, of the cleaved unsheathed optical fiber end portion 40a1 is slightly more than the length, $L_{uc}$, of the unsheathed fiber containment portion 50; however, the predetermined length, $L_u$, of the cleaved unsheathed optical fiber end portion 40a1 can be the same or slightly shorter than the length, $L_{uc}$, of the unsheathed fiber containment portion 50 so long as the unsheathed optical fiber end portion 40a1 of the optical fiber assembly 40 is adjacent to the first end 54a of the fiber stub 54 when an end of the sheath 40b is at about the second end 48b of the sheathed fiber containment portion 48 and any gap between the unsheathed optical fiber end portion 40a1 of the optical fiber assembly 40 and the first end 54a of the fiber stub 54 is filled with index matching gel 52 in a manner to achieve good optical transmission.

The second category fiber optic connector 42 is designed so that the unsheathed optical fiber end portion 40a1 of the optical fiber assembly 40 is inserted through the first and second ends 48a of the sheathed fiber containment portion 48. When the unsheathed optical fiber end portion 40a1 of the optical fiber assembly 40, having the predetermined length, $L_u$, extends into the index matching gel 52 and ends adjacent to and in contact with the first end 54a of the fiber stub 54, the sheath 40b of the optical fiber assembly 40 is positioned at about the second end 48b of the sheathed fiber containment portion 48.

Figure 11:
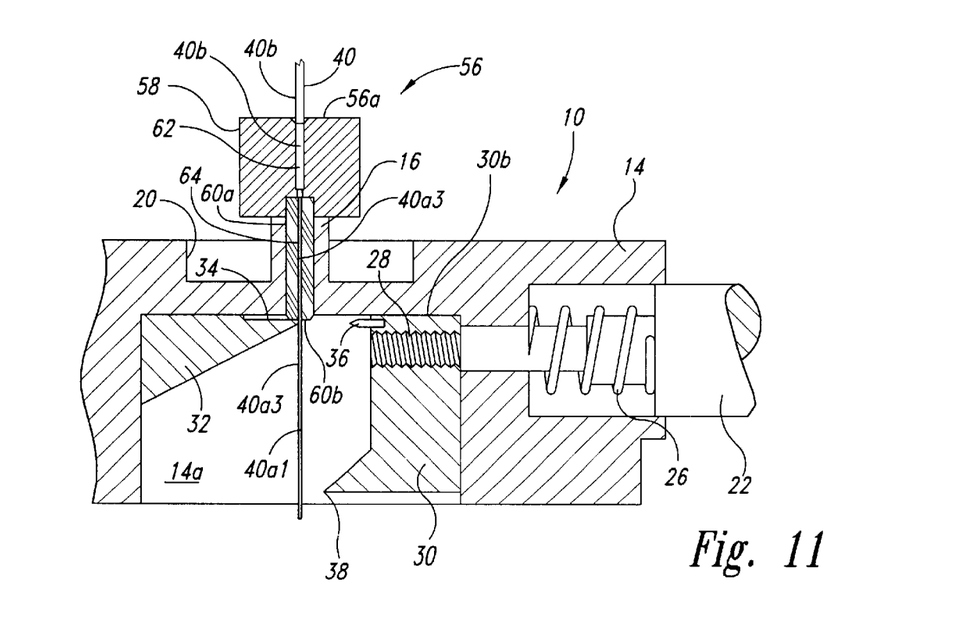
FIG. 11 is a fragmentary, enlarged, cross-sectional view of the optical fiber cleaver of FIG. 2 with the collection receptacle removed, showing the adapter of FIG. 10 installed on the optical fiber cleaver and showing the sheathed optical fiber end portion and the unsheathed optical fiber free end inserted into the adapter.

In the depicted embodiment of the invention, an adapter 56 is used to allow the fiber cleaver 10 designed for the first category fiber optic connector 42 to also be used for the second category fiber optic connector 46. The adapter 56 is shown in FIGS. 10a, 10b and 11, and has a first end 56a and a second end 56b. In the depicted embodiment, the adapter 56 is a body having a head piece 58 and a tail piece 60 sharing a longitudinal axis with the head piece and integrated into the head piece. The adapter 56 has a sheathed fiber containment portion 62 having first and second ends 62a and 62b and an unsheathed fiber containment portion 64 having first and second ends 64a and 64b. The first end 62a of the sheathed fiber containment portion 62 is coincident with the first end 56a of the adapter 56. The second end 62b of the sheathed fiber containment portion 62 is coincident with the first end 64a of the unsheathed fiber containment portion 64.

The sheathed fiber containment portion 62 of the adapter 56 is sized along the longitudinal axis of the adapter 56 with a length, $L_{sa}$, between the first and second ends 62a and 62b slightly longer than the length, $L_{sc}$, of the sheathed fiber containment portion 48 of the second category fiber optic connector 46 (shown in FIG. 9). As used herein, the lengths are considered substantially the same even though one is slightly longer and are preferably not equal in length; however, the lengths are to be considered substantially the same even if the lengths are equal or the other is slightly longer. The sheathed fiber containment portion 62 of the adapter 56 further includes a conical sheath receiving portion 62c and a main section 62d. The sheath receiving portion 62c has an inwardly tapered shape starting at the first end 62a of the sheathed fiber containment portion 62 and extending a minimally sufficient distance along the longitudinal axis of the adapter 56 into the sheathed fiber containment portion, as shown in FIG. 11, to assist in guiding the sheath 40b of the optical fiber assembly 40 into the adapter 56. The sheath receiving portion 62c gradually tapers to match an inner diameter, D62d, of the main section 62d of the sheathed fiber containment portion 62. The inner diameter, D62d, of the main section 62d is slightly larger than the outer diameter, $D_s$, of the sheath 40b of the optical fiber assembly 40.

The unsheathed fiber containment portion 64 of the adapter 56 is sized along the longitudinal axis of the adapter with a length, $L_{ua}$, between the first and second ends 64a and 64b. The unsheathed fiber containment portion 64 further includes an unsheathed fiber receiving portion 64c positioned between the first end 64a of the unsheathed fiber receiving portion 64 and an inward end of the tail piece 60, and a main section 64d within the tail piece 60. The unsheathed fiber receiving portion 64c has a larger diameter than the main section 64d, as shown in FIG. 11, to assist in guiding the unsheathed optical fiber end portion 40a1 of the optical fiber assembly 40 into the main section 64d of the unsheathed fiber containment portion 64. The unsheathed fiber receiving portion 64c, however, has a smaller diameter than the second end 62b of the sheathed fiber containment portion 62 so as to form a stop or shoulder to engage an end of the sheath 40b to prevent further inward movement of the optical fiber assembly 40. The inner diameter of the main section 64d of the unsheathed fiber containment portion 64 is slightly larger than the diameter, $D_u$, of the optical fiber 40a.

The adapter 56 is shown in use with the fiber cleaver 10 in the FIG. 11. The tail piece 60 has an external portion 60a having an outer diameter of Dfo, the same as the outer diameter of the connector ferrule 42b of the first category fiber optic connector 42 for which the fiber cleaver 10 was designed. The external portion 60a of the tail piece 60 is inserted into the port opening 18 of the housing port 16 until an outward end 60b thereof engages the stop 34. The tail piece 60 also has an inward end portion 60c, which is recessed into the head piece 58 of the adapter 56. The outward end 62b of the tail piece 60 is coincident with the second end 56b of the adapter 56. In other embodiments, the head piece 58 and the tail piece 60 are formed from one piece.

The length of the tail piece 60, and hence the unsheathed fiber containment portion 64 of the adapter 56, may be varied depending upon the length desired for the cleaved unsheathed optical fiber end portion 40a1 for the second category fiber optic connector being used.

Using the adapter 56 with the fiber cleaver 10 to cleave the unsheathed optical fiber end portion 40a1 of the optical fiber assembly 40 will produce a cleaved unsheathed optical fiber end portion with a predetermined length, $L_u$, being equal to the sum of the length, $L_{ua}$, of the unsheathed fiber containment portion 64 of the adapter, plus the predetermined miniscule amount, $L_m$, extending beyond the outward end 60b of the tail piece 60 that is left after the blade 36 cuts the free end portion 40a3 of the unsheathed optical fiber end portion 40a1, as described above when the fiber cleaver 10 is used to cleave the free end portion of the unsheathed optical fiber end portion for use in the first category fiber optic connector 42. As noted above and shown in FIG. 13, the length $L_u$ (i.e., $L_{ua}+L_m$), is selected to be slightly less than the length, $L_{uc}$, of the unsheathed fiber containment portion 50 of the second category fiber optic connector 46. This insures that the unsheathed optical fiber end portion 40a1 of the optical fiber assembly 40 contacts the first end 54a of the fiber stub 54.

When the adapter 56 is joined with the fiber cleaver 10, the external portion 60a of the tail piece 60 fits snugly inside of the port opening 18 in a manner similar to the connector ferrule 42b of the first category fiber optic connector 42. Before cleaving, the unsheathed optical fiber end portion 40a1 of the optical fiber assembly 40 extends past the second end 64b of the unsheathed fiber containment portion 64 into the housing chamber 14a to allow contact with the toe 38 of the pusher 30 for subsequent bending of the unsheathed optical fiber end portion. As discussed above, after cleaving of the unsheathed optical fiber end portion 40a1 of the optical fiber assembly 40 by the fiber cleaver 10, the unsheathed optical fiber end portion extends past the second end 64b of the unsheathed fiber containment portion 64 of the adapter 56 by the predetermined miniscule amount, $L_m$, so that the total length of the unsheathed optical fiber end portion, $L_u$, is the sum of the predetermined miniscule amount, $L_m$, plus the length, $L_{ua}$, of the unsheathed fiber containment portion of the adapter. Consequently, the total length, $L_u$, of the cleaved unsheathed optical fiber end portion is slightly more than the predetermined length, $L_{uc}$, of the second category fiber optic connector 46 so the end of the cleaved unsheathed optical fiber end portion touches the second end 54b of the fiber stub 54.

To aid in proper insertion of the fiber optic assembly 40 into the second category fiber optic connector 46, particularly to make sure that the end of the sheath 40b is sufficiently far inserted to be at the second end 48b of the sheath fiber containment portion 48 of the connector, when the optical fiber assembly 40 is inserted into the adapter 56 such that the sheath 40b engages and is stopped by the second end 62b of the sheathed fiber containment portion 62 of the adapter, the sheath protruding from the first end 56a of the adapter may be marked with a pen, or other marking instrument, to create an alignment mark on the sheath. This alignment mark will indicate the length of the sheath 40b measuring $L_{sa}$, which as noted above, was selected to be slightly longer than the length, $L_{sc}$, of the sheath fiber containment portion 48 of the second category fiber optic connector 46 (see FIG. 9).

The alignment mark on the sheath 40b is subsequently used when the optical fiber assembly 40 is inserted into the second category fiber optic connector 46 to indicate if the end of the sheath 40b is positioned at about the second end 48b of the sheath fiber containment portion 48 of the connector. If the alignment mark is just visible at the first end 48a of the sheath fiber containment portion 48, then it is properly positioned therein; however, if the alignment mark is spaced away from the first end 48a of the sheath fiber containment portion 48, then it is not properly positioned with the end of the sheath 40b adjacent to the second end 48b and the fiber optic assembly 40 must be pushed deeper into the sheath fiber containment portion 48 before being securely fixed therein such as by crimping. This also assures that the end of the cleaved unsheathed optical fiber end portion is not so far away from the second end 54b of the fiber stub 54 such that the index matching gel 52 might not fill the entire void therebetween and hence decrease light transmission through the second category fiber optic connector 46.

While the invention has been disclosed herein in connection with certain embodiments and detailed descriptions, it will be clear to one skilled in the art that modification or variations of such details can be made without deviating from the gist of this invention, and such modifications or variations are considered to be within the scope of the claims hereinbelow.

What is claimed is:

1. An adapter useable to convert a fiber cleaver constructed for use with a first category fiber optic connector to cleave a fiber of a fiber optic assembly after inserted within the first category fiber optic connector, to use with a second category fiber optic connector to cleave the fiber prior to insertion within the second category fiber optic connector, where the fiber optic assembly has an unsheathed fiber end portion extending beyond an end of a sheathed portion, and when used with a first category fiber optic connector having a connector ferrule with a passageway extending to a passageway opening at a distal end of the connector ferrule, the sheathed portion is inserted within the first category fiber optic connector with the unsheathed fiber end portion extending through the connector ferrule passageway and out of the connector ferrule passageway opening and extending beyond the connector ferrule distal end, the fiber cleaver having a housing chamber containing a stop and a housing opening having an end, the housing opening end being adjacent to and opening into the housing chamber proximate to the stop, the housing opening being sized to receive the connector ferrule therein and the stop being arranged to engage the connector ferrule distal end and hold the connector ferrule distal end at a predetermined position within the housing chamber against further movement into the housing chamber with the unsheathed fiber end portion extending beyond the connector ferrule distal end and into the housing chamber, the fiber cleaver having a cleave member within the housing chamber configured to cleave, without use of the adapter, the unsheathed fiber end portion extending out of the connector ferrule passageway opening to a first length extending beyond the connector ferrule distal end, the adapter comprising:

a body having an insertion portion with a distal end, the insertion portion being sized to be removably received within the housing opening with the insertion portion distal end in engagement with the stop, the body having a passageway extending to a passageway opening at the insertion portion distal end, the body passageway having a first lengthwise portion sized to receive the sheathed portion of the fiber optic assembly therein and a second lengthwise portion extending to the body passageway opening and sized to receive therein the unsheathed fiber end portion, the body further including a stop arranged to engage the end of the sheathed portion when inserted into the body passageway first portion and hold the fiber optic assembly at a predetermined position within the body passageway against further movement toward the body passageway opening with the unsheathed fiber end portion extending out of the passageway opening beyond the insertion portion distal end by at least the amount of the first length and into the housing chamber for cleaving by the fiber cleaver cleave member to a second length, the second length being measured while in the body passageway after cleaving as the sum of the length of the unsheathed fiber end portion extending beyond the end of the sheathed portion to the insertion portion distal end plus the amount of the first length.

2. The adapter of claim 1 for use with the second category fiber optic connector having a passageway sized to receive the sheathed portion of the fiber optic assembly therein with a lengthwise portion of a third length, wherein the body passageway first portion is substantially the same length as the third length.

3. The adapter of claim 1 wherein the body passageway first and second portions are coaxial.

4. The adapter of claim 1 for use with the housing having an outward surface extending at least partially about an outward end of the housing opening, wherein the body further includes a head portion to which the insertion portion is rigidly connected and from which the insertion portion extends, the head portion having a width larger than a width of the insertion portion, the insertion portion having a length to position the head portion proximate to the surface of the housing when the insertion portion is within the housing opening with the insertion portion distal end in engagement with the stop, the body passageway extending through the head portion and lengthwise through the insertion portion, the body passageway first portion being located within the head portion.

5. The adapter of claim 1 for use with the second category fiber optic connector having a passageway sized to receive the sheathed portion of the fiber optic assembly therein with an interior stop to engage the end of the sheathed portion when inserted into the connector passageway and having a fiber stub with an inward end spaced away from the interior stop by a predetermined distance, wherein when the unsheathed fiber end portion is cleaved by the fiber cleaver cleave member a cleaved fiber end is produced, and wherein the second length is selected to extend the predetermined distance so as to position the cleaved fiber end adjacent to the inward end of the fiber stub when the sheathed portion of the fiber optic assembly is within the connector passageway with the end of the sheathed portion at about the interior stop.

6. The adapter of claim 1 wherein the insertion portion has a width to fit snuggly within the housing opening.

7. The adapter of claim 1 wherein the body stop is a shoulder defined by the difference in width sizes at a junction of the body passageway first and second portions, the body passageway first portion having a first width size at the junction and the body passageway second portion having a second width size at the junction less than the first width size.

8. An adapter useable to convert a fiber cleaver constructed for use with a first category fiber optic connector to cleave an optical fiber of a fiber optic assembly after inserted within the first category fiber optic connector, to use with a second category fiber optic connector to cleave the fiber prior to insertion within the second category fiber optic connector, where the fiber optic assembly has an unsheathed fiber end portion extending beyond an end of a sheathed portion having a sheathed portion end width, and when used with a first category fiber optic connector having a connector ferrule with a passageway extending to a passageway opening at a distal end of the connector ferrule, the sheathed portion is inserted within the first category fiber optic connector with the unsheathed fiber end portion extending through the connector ferrule passageway and out of the connector ferrule passageway opening and extending beyond the connector ferrule distal end, the fiber cleaver having a housing chamber containing a stop and a housing opening having an end, the housing opening end being adjacent to and opening into the housing chamber proximate to the stop, the housing opening being sized to receive the connector ferrule therein and the stop being arranged to engage the connector ferrule distal end and hold the connector ferrule distal end at a predetermined position within the housing chamber against further movement into the housing chamber with the unsheathed fiber end portion extending beyond the connector ferrule distal end and into the housing chamber, the fiber cleaver having a cleave member within the housing chamber configured to cleave, without use of the adapter, the unsheathed fiber end portion extending out of the connector ferrule passageway opening to a first length extending beyond the connector ferrule distal end, the adapter comprising:

a body having an insertion portion with a distal end, the insertion portion being sized to be removably received within the housing opening with the insertion portion distal end in engagement with the stop, the body having a passageway extending to a passageway opening at the insertion portion distal end, the body passageway having a first lengthwise portion sized to receive the sheathed portion of the fiber optic assembly therein and a second lengthwise portion extending to the body passageway opening and sized to receive therein the unsheathed fiber end portion, the body passageway second portion having a width at the junction with the body passageway first portion sized less than the sheathed portion end width to prevent passage of the sheathed portion through the body passageway second portion when inserted into the body passageway first portion to thereby hold the fiber optic assembly at a predetermined position within the body passageway against further movement toward the body passageway opening with the unsheathed fiber end portion extending out of the passageway opening beyond the insertion portion distal end by at least the amount of the first length and into the housing chamber for cleaving by the fiber cleaver cleave member to a second length, the second length being measured while in the body passageway after cleaving as the sum of the length of the unsheathed fiber end portion extending beyond the end of the sheathed portion to the insertion portion distal end plus the amount of the first length.

9. The adapter of claim 8 for use with the second category fiber optic connector having a passageway sized to receive the sheathed portion of the fiber optic assembly therein with a lengthwise portion of a third length, wherein the body passageway first portion is substantially the same length as the third length.

10. The adapter of claim 8 wherein the body passageway first and second portions are coaxial.

11. The adapter of claim 8 wherein the body further includes a head portion to which the insertion portion is rigidly connected and from which the insertion portion extends, the head portion having a size for grasping by the user of the adapter, the body passageway extending through the head portion and lengthwise through the insertion portion, the body passageway first portion being located within the head portion.

12. The adapter of claim 8 for use with the second category fiber optic connector having a passageway sized to receive the sheathed portion of the fiber optic assembly therein with an interior stop to engage the end of the sheathed portion when inserted into the connector passageway and having a fiber stub with an inward end spaced away from the interior stop by a predetermined distance, wherein when the unsheathed fiber end portion is cleaved by the fiber cleaver cleave member a cleaved fiber end is produced, and wherein the second length is selected to extend the predetermined distance so as to position the cleaved fiber end adjacent to the inward end of the fiber stub when the sheathed portion of the fiber optic assembly is within the connector passageway with the end of the sheathed portion at about the interior stop.

13. The adapter of claim 8 wherein the insertion portion has a width to fit snuggly within the housing opening.

14. A fiber cleaver and an adapter useable to convert the fiber cleaver constructed for use with a first category fiber optic connector to cleave a fiber of a fiber optic assembly after inserted within the first category fiber optic connector, to use with a second category fiber optic connector to cleave the fiber prior to insertion within the second category fiber optic connector, where the fiber optic assembly has an unsheathed fiber end portion extending beyond an end of a sheathed portion, and when used with a first category fiber optic connector having a connector ferrule with a passageway extending to a passageway opening at a distal end of the connector ferrule, the sheathed portion is inserted within the first category fiber optic connector with the unsheathed fiber end portion extending through the connector ferrule passageway and out of the connector ferrule passageway opening and extending beyond the connector ferrule distal end, comprising:

the fiber cleaver having a housing chamber containing a stop and a housing opening having an end, the housing opening end being adjacent to and opening into the housing chamber proximate to the stop, the housing opening being sized to receive the connector ferrule therein and the stop being arranged to engage the connector ferrule distal end and hold the connector ferrule distal end at a predetermined position within the housing chamber against further movement into the housing chamber with the unsheathed fiber end portion extending beyond the connector ferrule distal end and into the housing chamber, the fiber cleaver having a cleave member within the housing chamber configured to cleave, without use of the adapter, the unsheathed fiber end portion extending out of the connector ferrule passageway opening to a first length extending beyond the connector ferrule distal end; and the adapter having a body with an insertion portion having a distal end, the insertion portion being sized to be removably received within the housing opening with the insertion portion distal end in engagement with the stop, the body having a passageway extending to a passageway opening at the insertion portion distal end, the body passageway having a first lengthwise portion sized to receive the sheathed portion of the fiber optic assembly therein and a second lengthwise portion extending to the body passageway opening and sized to receive therein the unsheathed fiber end portion, the body further including a stop arranged to engage the end of the sheathed portion when inserted into the body passageway first portion and hold the fiber optic assembly at a predetermined position within the body passageway against further movement toward the body passageway opening with the unsheathed fiber end portion extending out of the passageway opening beyond the insertion portion distal end by at least the amount of the first length and into the housing chamber for cleaving by the fiber cleaver cleave member to a second length, the second length being measured while in the body passageway after cleaving as the sum of the length of the unsheathed fiber end portion extending beyond the end of the sheathed portion to the insertion portion distal end plus the amount of the first length.

15. The fiber cleaver and adapter of claim 14 for use with the second category fiber optic connector having a passageway sized to receive the sheathed portion of the fiber optic assembly therein with a lengthwise portion of a third length, wherein the adapter body passageway first portion is substantially the same length as the third length.

16. The fiber cleaver and adapter of claim 14 wherein the adapter body passageway first and second portions are coaxial.

17. The fiber cleaver and adapter of claim 14 wherein the housing has an outward surface extending at least partially about an outward end of the housing opening, and wherein the adapter body further includes a head portion to which the insertion portion is rigidly connected and from which the insertion portion extends, the head portion having a width larger than a width of the insertion portion, the insertion portion having a length to position the head portion proximate to the surface of the housing when the insertion portion is within the housing opening with the insertion portion distal end in engagement with the stop, the body passageway extending through the head portion and lengthwise through the insertion portion, the body passageway first portion being located within the head portion.

18. The fiber cleaver and adapter of claim 14 for use with the second category fiber optic connector having a passageway sized to receive the sheathed portion of the fiber optic assembly therein with an interior stop to engage the end of the sheathed portion when inserted into the connector passageway and having a fiber stub with an inward end spaced away from the interior stop by a predetermined distance, wherein when the unsheathed fiber end portion is cleaved by the fiber cleaver cleave member a cleaved fiber end is produced, and wherein the second length is selected to extend the predetermined distance so as to position the cleaved fiber end adjacent to the inward end of the fiber stub when the sheathed portion of the fiber optic assembly is within the connector passageway with the end of the sheathed portion at about the interior stop.

19. The fiber cleaver and adapter of claim 14 wherein the adapter insertion portion has a width to fit snuggly within the housing opening.

20. The fiber cleaver and adapter of claim 1 wherein the adapter body stop is a shoulder defined by the difference in width sizes at a junction of the body passageway first and second portions, the body passageway first portion having a first width size at the junction and the body passageway second portion having a second width size at the junction less than the first width size.

21. An adapter useable to convert a fiber cleaver constructed for use with a first category fiber optic connector to cleave a fiber of a fiber optic assembly after inserted within the first category fiber optic connector, to use with a second category fiber optic connector to cleave the fiber prior to insertion within the second category fiber optic connector, where the fiber optic assembly has an unsheathed fiber end portion extending beyond an end of a sheathed portion, and when used with a first category fiber optic connector having a connector ferrule with a passageway extending to a passageway opening at a distal end of the connector ferrule, the sheathed portion is inserted within the first category fiber optic connector with the unsheathed fiber end portion extending through the connector ferrule passageway and out of the connector ferrule passageway opening beyond the connector ferrule distal end, the fiber cleaver having a housing with a housing opening sized to receive the connector ferrule therein with the connector ferrule distal end at a predetermined position and with the unsheathed fiber end portion extending beyond the connector ferrule distal end in a position for cleaving by a cleave member of the fiber cleaver, without use of the adapter, to a first length extending beyond the connector ferrule distal end, the adapter comprising:

a body having an insertion portion with a distal end, the insertion portion being sized to be removably received within the housing opening, the body having a passageway extending to a passageway opening at the insertion portion distal end, the body passageway sized to receive the fiber optic assembly therein, the body further including a member portion configured to hold the fiber optic assembly at a predetermined position within the body passageway with the unsheathed fiber end portion extending out of the passageway opening beyond the insertion portion distal end by at least the amount of the first length and into a position for cleaving by the fiber cleaver cleave member to a second length, the second length being measured while in the body passageway after cleaving as the sum of the length of the unsheathed fiber end portion extending beyond the end of the sheathed portion to the insertion portion distal end plus the amount of the first length.

22. The adapter of claim 21 for use with the second category fiber optic connector having a passageway sized to receive the sheathed portion of the fiber optic assembly therein with an interior stop to engage the end of the sheathed portion when inserted into the connector passageway and having a fiber stub with an inward end spaced away from the interior stop by a predetermined distance, wherein when the unsheathed fiber end portion is cleaved by the fiber cleaver cleave member a cleaved fiber end is produced, and wherein the second length is selected to extend the predetermined distance so as to position the cleaved fiber end adjacent to the inward end of the fiber stub when the sheathed portion of the fiber optic assembly is within the connector passageway with the end of the sheathed portion at about the interior stop.

23. The adapter of claim 21 wherein the insertion portion has a width to fit snuggly within the housing opening.

24. An adapter useable to convert a fiber cleaver constructed for use with a first category fiber optic connector to cleave a fiber of a fiber optic assembly after inserted within the first category fiber optic connector, to use with a second category fiber optic connector to cleave the fiber prior to insertion within the second category fiber optic connector, where the fiber optic assembly has an unsheathed fiber end portion extending beyond an end of a sheathed portion, and when used with a first category fiber optic connector having a connector ferrule with a passageway extending to a passageway opening at a distal end of the connector ferrule, the sheathed portion is inserted within the first category fiber optic connector with the unsheathed fiber end portion extending through the connector ferrule passageway and out of the connector ferrule passageway opening beyond the connector ferrule distal end, the fiber cleaver having a housing with a housing opening sized to receive the connector ferrule therein with the connector ferrule distal end at a predetermined position and with the unsheathed fiber end portion extending beyond the connector ferrule distal end in a position for cleaving by a cleave member of the fiber cleaver, without use of the adapter, to a first length extending beyond the connector ferrule distal end, the adapter comprising:

a body having an insertion portion with a distal end, the insertion portion being sized to be removably received within the housing opening, the body having a passageway extending to a passageway opening at the insertion portion distal end and sized to receive the fiber optic assembly therein, the body being configured to hold the fiber optic assembly at a predetermined position within the body passageway against movement toward the body passageway opening with the unsheathed fiber end portion extending out of the passageway opening beyond the insertion portion distal end by at least the amount of the first length and into the housing chamber for cleaving by the fiber cleaver cleave member to a second length, the second length being measured while in the body passageway after cleaving as the sum of the length of the unsheathed fiber end portion extending beyond the end of the sheathed portion to the insertion portion distal end plus the amount of the first length.

25. The adapter of claim 24 wherein the body includes a stop arranged to engage the end of the sheathed portion when inserted into the body passageway to hold the fiber optic assembly at the predetermined position within the body passageway against further movement toward the body passageway opening.

26. The adapter of claim 24 for use with the second category fiber optic connector having a passageway sized to receive the sheathed portion of the fiber optic assembly therein with an interior stop to engage the end of the sheathed portion when inserted into the connector passageway and having a fiber stub with an inward end spaced away from the interior stop by a predetermined distance, wherein when the unsheathed fiber end portion is cleaved by the fiber cleaver cleave member a cleaved fiber end is produced, and wherein the second length is selected to extend the predetermined distance so as to position the cleaved fiber end adjacent to the inward end of the fiber stub when the sheathed portion of the fiber optic assembly is within the connector passageway with the end of the sheathed portion at about the interior stop.

27. The adapter of claim 24 wherein the insertion portion has a width to fit snuggly within the housing opening.

28. An adapter for use with a fiber cleaver, the fiber cleaver configured to receive a connector ferrule and cleave an unsheathed optical fiber end portion of a first optical fiber assembly extending beyond the connector ferrule to a first length, the adapter comprising:

a body having an insertion member configured to be received by the fiber cleaver in lieu of the connector ferrule, the insertion member containing a passageway for removably receiving an unsheathed optical fiber end portion of a second optical fiber assembly and having a passageway opening through which the unsheathed optical fiber end portion of the second optical fiber assembly extends for cleaving by the fiber cleaver while the adapter is received by the fiber cleaver, the body further including a portion configured to engage the second optical fiber assembly when received within the passageway with the unsheathed optical fiber end portion thereof extending through the passageway opening and to hold the second optical fiber assembly at a predetermined position within the passageway against further movement toward the passageway opening so that upon cleaving by the fiber cleaver the unsheathed optical fiber end portion of the second optical fiber assembly is a second length, the second length being different than the first length.

29. The adapter of claim 28 wherein the passageway is configured to allow insertion into the adapter and removal from the adapter of the unsheathed optical fiber end portion of the second optical fiber assembly while the adapter remains received by the fiber cleaver.

30. A method of using an adapter in conjunction with a fiber cleaver, for cleaving an unsheathed optical fiber end portion of an optical fiber assembly without use of the adapter to a first length and with use of the adapter to a second length with the second length being greater than the first length, the adapter having a stop to engage an end of a sheathed portion of the optical fiber assembly, the method comprising:

inserting the adapter into the fiber cleaver;

inserting the optical fiber assembly into the adapter with the unsheathed optical fiber end portion of the optical fiber assembly extending beyond the adapter and with the end of a sheathed portion of the optical fiber assembly against the adapter stop;

cleaving the unsheathed optical fiber end portion of the optical fiber assembly extending beyond the adapter while the optical fiber assembly is within the adapter and the end of the sheathed portion of the optical fiber assembly is against the adapter stop to cleave the unsheathed optical fiber end portion to the second length; and removing the optical fiber assembly from the adapter after the unsheathed optical fiber end portion of the optical fiber assembly has been cleaved to the second length.

31. A method of using an adapter in conjunction with a fiber cleaver, for cleaving an unsheathed optical fiber end portion of an optical fiber assembly, the method comprising:

inserting the adapter into the fiber cleaver;

inserting the optical fiber assembly into the adapter with the unsheathed optical fiber end portion of the optical fiber assembly extending beyond the adapter;

after inserting the optical fiber assembly into the adapter, affixing a mark on to a portion of a sheathed optical fiber portion of the optical fiber assembly protruding from the adapter, the mark made with a predetermined positional relationship to a structural aspect of the adapter;

cleaving the unsheathed optical fiber end portion of the optical fiber assembly extending beyond the adapter while the optical fiber assembly is within the adapter;

removing the optical fiber assembly from the adapter after the unsheathed optical fiber end portion of the optical fiber assembly has been cleaved; and after removing the optical fiber assembly from the adapter, inserting the optical fiber assembly into a fiber connector until the affixed mark attains a predetermined positional relationship with a structural aspect of the fiber connector, thereby achieving a predetermined positioning of the optical fiber assembly with respect to the fiber connector.

32. The method of claim 31 wherein the predetermined positional relationship to the structural aspect of the adapter is a position on the sheathed optical fiber portion of the optical fiber assembly adjacent an end of the adapter where the optical fiber assembly is inserted into the adapter.

33. The method of claim 31 wherein the predetermined positional relationship of the affixed mark with the structural aspect of the fiber connector is that the affixed mark is adjacent an end of the fiber connector where the optical fiber assembly is inserted into the fiber connector.

34. The adapter of claim 28 wherein the body portion configured to engage the second optical fiber assembly is a stop arranged to engage an end of a sheathed portion of the second optical fiber assembly when received within the passageway with the unsheathed optical fiber end portion thereof extending through the passageway opening.

* * * * *